United States Patent
Yanagawa et al.

(10) Patent No.: US 9,110,466 B2
(45) Date of Patent: Aug. 18, 2015

(54) PROGRAMMING METHOD FOR A ROBOT, PROGRAMMING APPARATUS FOR A ROBOT, AND ROBOT CONTROL SYSTEM

(75) Inventors: Kouzou Yanagawa, Osaka (JP); Yasuhiro Koujina, Osaka (JP)

(73) Assignee: Daihen Corporation, Osaka (JP)

( * ) Notice: Subject to any disclaimer, the term of this patent is extended or adjusted under 35 U.S.C. 154(b) by 1158 days.

(21) Appl. No.: 13/072,298

(22) Filed: Mar. 25, 2011

(65) Prior Publication Data
US 2011/0238215 A1 Sep. 29, 2011

(30) Foreign Application Priority Data

Mar. 29, 2010 (JP) ................................. 2010-075060
Dec. 13, 2010 (JP) ................................. 2010-276901

(51) Int. Cl.
*B25J 9/10* (2006.01)
*G05B 19/42* (2006.01)
(Continued)

(52) U.S. Cl.
CPC ................ *G05B 19/42* (2013.01); *B23Q 17/24* (2013.01); *G05B 19/401* (2013.01); *G05B 19/423* (2013.01); *G05B 19/425* (2013.01); *G05B 19/427* (2013.01); *G05B 2219/36404* (2013.01); *G05B 2219/36504* (2013.01); *G05B 2219/37555* (2013.01); *G05B 2219/39527* (2013.01);
(Continued)

(58) Field of Classification Search
CPC .... G05B 19/42; G05B 19/401; G05B 19/423; G05B 19/425; G05B 19/427; G05B 2219/36404; G05B 2219/36504; G05B 2219/37555; G05B 2219/39527; G05B 2219/40622; G05B 2219/40564; B23Q 17/24

USPC ......... 700/245, 251, 254, 257, 258, 259, 262, 700/264; 901/1, 3, 4, 41, 42, 46, 47
See application file for complete search history.

(56) References Cited

U.S. PATENT DOCUMENTS 6,285,920 B1 * 9/2001 McGee et al. ................ 700/254
2001/0013511 A1 * 8/2001 Hong ........................ 219/124.34
(Continued)

FOREIGN PATENT DOCUMENTS

JP          57-109576          7/1982
JP          58-188566         11/1983
(Continued)

OTHER PUBLICATIONS

Japanese Office Action for Japanese Application No. 2010-276901, dated May 16, 2014. English translation not provided.
(Continued)

*Primary Examiner* — Khoi Tran
*Assistant Examiner* — Robert Nguyen
(74) *Attorney, Agent, or Firm* — Patterson Thuente Pederson, P.A.

(57) ABSTRACT

An operator inputs a sensing instruction at a sensing point, which is a rough taught point, in a teaching mode (S22). The instruction and sensing point are stored in a second storage region (S23). Further, a target angle and an advance/retraction angle are both input in the second storage region (S24). A CPU moves a robot to the sensing point (S33) in a sensing mode, to perform detection tasks by a laser sensor, thereby acquiring the shape of a workpiece (S33). The CPU calculates a position and a posture of a welding torch to create a task program (S35). In such a manner, it is possible to greatly simplify teaching tasks in an environment free of workpiece displacements.

10 Claims, 11 Drawing Sheets

| Training step no. | Instruction | Sensing mode | Execution mode |
|---|---|---|---|
| 1 | Positioning instruction | Moves to home position | Moves to home position |
| 2 | Sensing instruction | (1) Moves to sensing point PA stored in teaching mode (2) Performs sensing to obtain groove position A' and groove reference angle | Moves welding torch tip to groove position A' in welding torch posture having target angle posture value and advance/retraction angle posture value |
| 3 | Welding start instruction | Ignores welding start instruction | Starts welding |
| 4 | Sensing instruction | (1) Moves to sensing point PB stored in training mode (2) Performs sensing to obtain groove position B' | Moves welding torch tip to groove position B' in posture at the position of groove position A' |
| 5 | Welding end instruction | Ignores welding end instruction | Ends welding |
| 6 | Positioning instruction | Moves to home position | Moves to home position |
| 7 | END | | |

(51) Int. Cl.
  *G05B 19/425* (2006.01)
  *G05B 19/423* (2006.01)
  *G05B 19/401* (2006.01)
  *G05B 19/427* (2006.01)
  *B23Q 17/24* (2006.01)

(52) U.S. Cl.
  CPC ............. *G05B2219/40564* (2013.01); *G05B 2219/40622* (2013.01)

(56) References Cited

U.S. PATENT DOCUMENTS

| | | | | |
|---|---|---|---|---|
| 2005/0102060 | A1* | 5/2005 | Watanabe et al. | 700/245 |
| 2006/0030970 | A1* | 2/2006 | Watanabe et al. | 700/248 |
| 2006/0271240 | A1* | 11/2006 | Nihei et al. | 700/245 |
| 2007/0142973 | A1* | 6/2007 | Takizawa et al. | 700/259 |
| 2007/0213873 | A1* | 9/2007 | Ban et al. | 700/245 |
| 2008/0221733 | A1* | 9/2008 | Morrow et al. | 700/258 |
| 2008/0300723 | A1* | 12/2008 | Ban et al. | 700/259 |
| 2010/0114338 | A1* | 5/2010 | Bandyopadhyay et al. | 700/36 |
| 2010/0312391 | A1* | 12/2010 | Choi et al. | 700/254 |
| 2010/0332032 | A1* | 12/2010 | Moriyama et al. | 700/258 |
| 2011/0033254 | A1* | 2/2011 | Abrams | 408/1 R |
| 2012/0078418 | A1* | 3/2012 | Borm et al. | 700/254 |

FOREIGN PATENT DOCUMENTS

| | | |
|---|---|---|
| JP | 02-235112 | 9/1990 |
| JP | 08-123536 | 5/1996 |
| JP | 09-076065 | 3/1997 |
| JP | 09-183087 | 7/1997 |
| JP | 09-218705 | 8/1997 |
| JP | 3200106 | 6/2001 |
| JP | 2004142015 | 5/2004 |
| JP | 2005131761 | 5/2005 |
| JP | 2005149299 | 6/2005 |
| JP | 2008073813 | 4/2008 |
| JP | 2010142910 | 7/2010 |
| WO | WO 01/61618 A1 | 8/2001 |
| WO | WO2009/025271 | 2/2009 |

OTHER PUBLICATIONS

European Search Report for Application No. 11002509.5 dated Apr. 9, 2014.

* cited by examiner

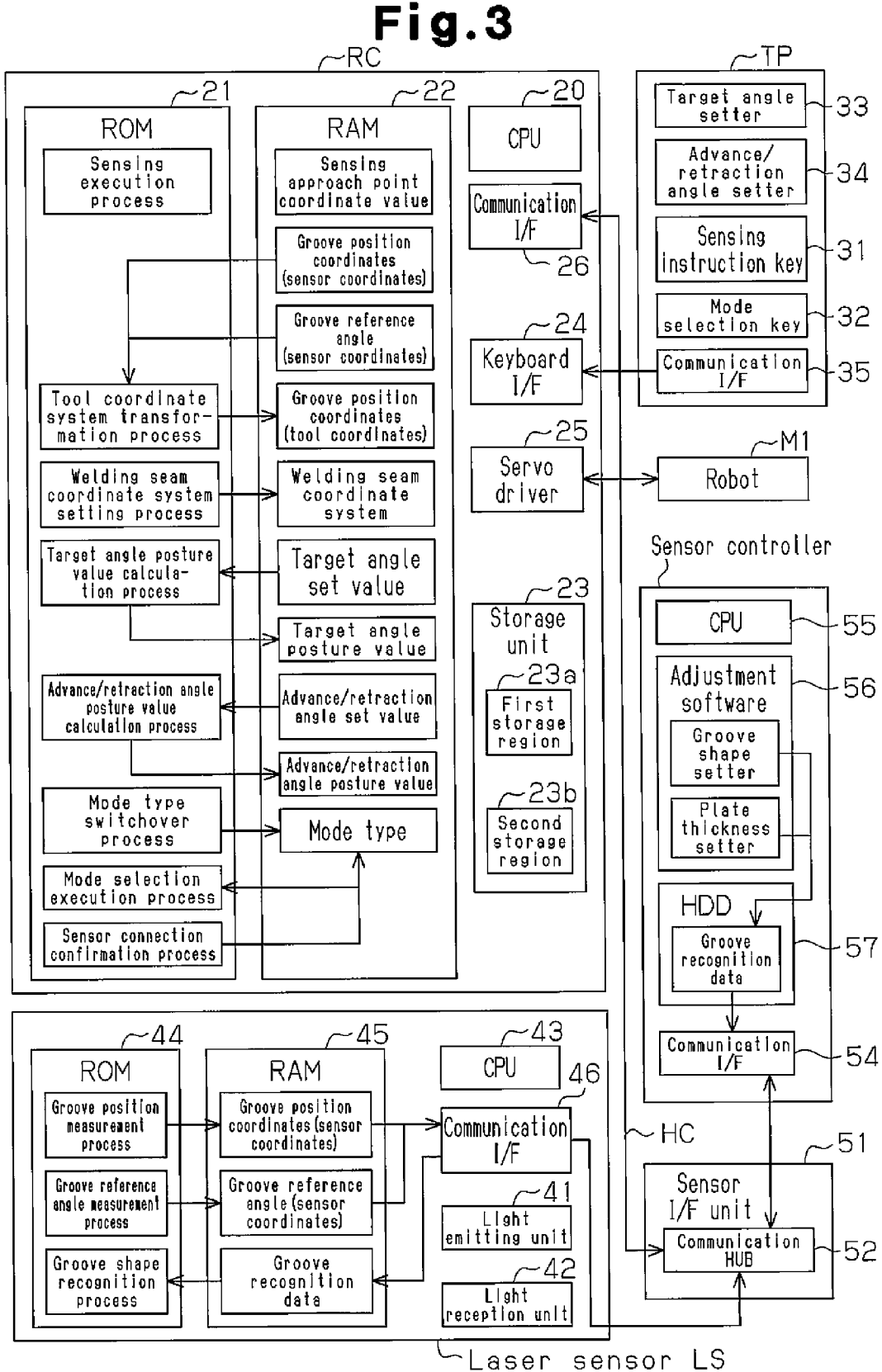

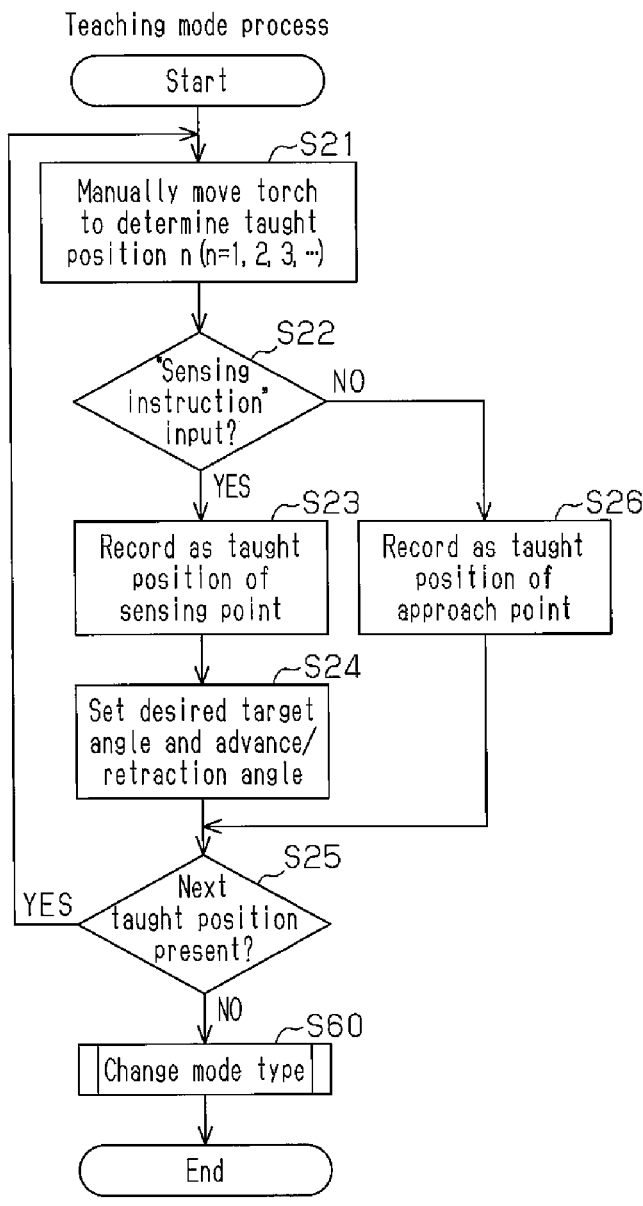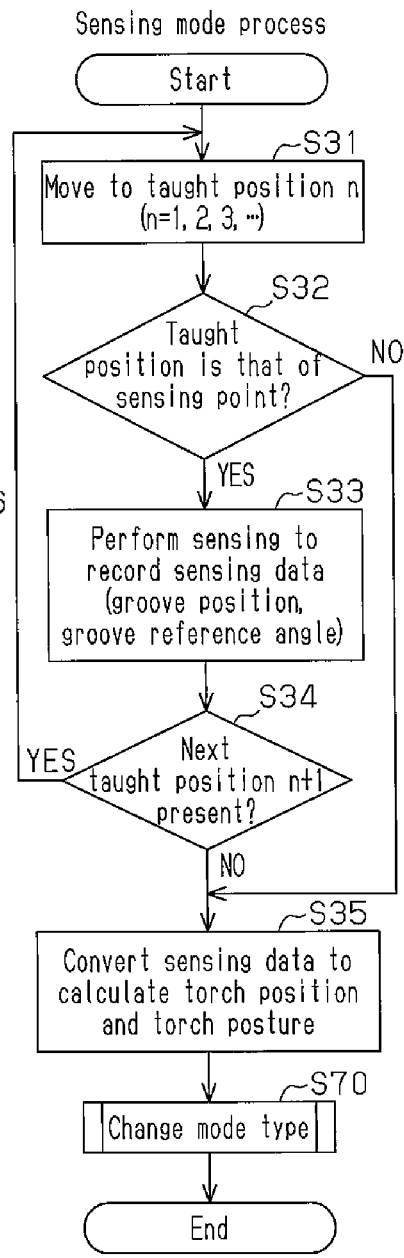

Fig.13

| Training step no. | Instruction | Sensing mode | Execution mode |
|---|---|---|---|
| 1 | Positioning instruction | Moves to home position | Moves to home position |
| 2 | Sensing instruction | (1) Moves to sensing point PA stored in teaching mode<br>(2) Performs sensing to obtain groove position A' and groove reference angle | Moves welding torch tip to groove position A' in welding torch posture having target angle posture value and advance/retraction angle posture value |
| 3 | Welding start instruction | Ignores welding start instruction | Starts welding |
| 4 | Sensing instruction | (1) Moves to sensing point PB stored in training mode<br>(2) Performs sensing to obtain groove position B' | Moves welding torch tip to groove position B' in posture at the position of groove position A' |
| 5 | Welding end instruction | Ignores welding end instruction | Ends welding |
| 6 | Positioning instruction | Moves to home position | Moves to home position |
| 7 | END | | |

PROGRAMMING METHOD FOR A ROBOT, PROGRAMMING APPARATUS FOR A ROBOT, AND ROBOT CONTROL SYSTEM

BACKGROUND OF THE INVENTION

The present invention relates to a programming method for a robot, a programming apparatus for a robot, and a robot control system.

In arc welding, it is necessary to teach to a robot so that the tip of a tool referred to as a torch and a junction portion may strictly agree. In addition, the posture of the torch is also important in order to maintain task quality. Accordingly, if the junction portion has a complicated shape, it takes a lot of time to provide teaching for the junction portion. Therefore, a teaching-free approach has been developed to reduce the number of teaching processes. However, there is no arc welding robot available that has realized complete teaching-free task, leaving some teaching tasks necessary to be performed by human beings.

Japanese Laid-Open Patent Publication No. 8-123536 discloses a welding torch posture teaching method. In the method disclosed in the present document, a reference plane is calculated from a taught torch position, to obtain a posture with respect to the reference plane by using input values of a target angle and an advance/retraction angle, thereby acquiring a desired welding torch posture. Further, in the present method, for each torch position, each posture in which desired target angle and advance/retraction angle are reflected is created and written in a program that inputs the torch positions. In such a manner, the present method calculates a reference plane based on a torch position input beforehand, and therefore can automatically calculate a welding torch posture if an operator inputs angle data of desired target angle and advance/retraction angle in a reference plane. Therefore, in teaching a welding torch posture, manual tasks for causing a robot to assume a desired posture are unnecessary, thereby simplifying the teaching tasks.

Japanese Patent No. 3200106 discloses a method for recognizing a preset shape of a workpiece with a laser sensor to obtain the position of a groove and then correcting a position of the torch tip and a torch posture. In the method disclosed in the present document, reference taught data is created roughly beforehand. Then, at the time of execution of welding, to modify the reference taught data, a groove shape is imaged with a laser sensor or the like mounted on a robot. That is, the taught data is corrected based on a result of the imaging by the laser sensor, so that it is only necessary to create rough taught data beforehand, thereby simplifying the teaching tasks.

Japanese Laid-Open Patent Publication No. 9-76065 discloses a welding torch robot that realizes a desired torch position/posture by copying a welding seam with a laser sensor in real time during welding. In the method disclosed in the present document, taught data created beforehand is corrected based on image data obtained using the laser sensor. Accordingly, welding can be continued even if a three-dimensional displacement occurs in a workpiece. The present invention does not aim at simplification of teaching tasks. However, it suggests a possibility for simplification of teaching tasks in creating rough taught data and correcting taught data in real time so as to provide a desired welding position/posture by using a sensor when welding.

According to Japanese Laid-Open Patent Publication No. 8-123536, a reference plane is determined based on a position of the tool such as a torch, so that it is necessary to program the position with strict accuracy. When programming the position, it is necessary to move a robot to a desired position manually. Accordingly, if there are a lot of points to teach, a lot of labor is required for teaching tasks. Moreover, by the present method, even with a slight difference in workpiece shape, a task is required to modify or add the positions of the tool.

The inventions disclosed in Japanese Patent No. 3200106 and Japanese Laid-Open Patent Publication H9-76065 aim at correcting displacements of a workpiece. The displacement is caused by an error in machining or setting of the workpiece. However, recently, the workpiece machining errors have been eliminated and, further, a workpiece fixing jig is improved so that no displacements may occur. Therefore, no displacements would occur on at least 90 percent of the workpieces to be machined.

Accordingly, in an environment free of workpiece displacements, it is of no use to use a position detection sensor such as the laser sensor or mount the position detection sensor on a welding robot during welding by use of the welding robot.

On the other hand, in the case of simplifying teaching tasks by using a position detection sensor such as a laser sensor in the environment free of workpiece displacements, the following problems occur.

(1) When executing taught data, that is, each time actual tasks are performed using a tool, detection tasks are performed by the position detection sensor. This has a large effect on the cycle time.

(2) One laser sensor is necessary for each robot. This increases introduction costs.

(3) Also when actual tasks are performed using a tool, it is necessary to mount the position detection sensor. This increases power consumption.

SUMMARY OF THE INVENTION

It is an objective of the present invention to provide a programming method for a robot, a programming apparatus for a robot, and robot control system that reduce an actual task cycle time by simplifying teaching tasks in a teaching mode and eliminating the need for detection by a position detection sensor during actual tasks by use of a tool in an environment free of workpiece displacements.

To achieve the foregoing objective and in accordance with a first aspect of the present invention, a programming method for a robot is provided. The robot includes a manipulator configured to machine a workpiece. The manipulator is equipped with a tool and a position detection sensor for detecting a position of a characteristic site of the workpiece. The method includes: a first step for inputting a sensing instruction each time the tool reaches a sensing point; a second step for storing the sensing instruction and a taught position for the sensing point in a first task program while associating the sensing instruction and a taught position for the sensing point with each other; and a third step for moving the tool to the taught position of the sensing point to perform detection tasks by the position detection sensor based on the sensing instruction in the first task program, acquiring a work location for the workpiece based on a result of the detection, and then storing the acquired work location in a second task program or in an external variable that can be referenced from the second task program. By executing the second task program, the tool is moved to perform the machining.

In accordance with a second aspect of the present invention, a programming apparatus for a robot is provided. The robot includes a manipulator configured to machine a workpiece. The manipulator is equipped with a tool and a position detection sensor for detecting a position of a characteristic site of the workpiece. The apparatus includes a sensor instruction input, a first storage, a controller, acquisition means, and a second storage. The sensor instruction input inputs a sensing instruction each time the tool reaches a taught position of a sensing point. The first storage stores the sensing instruction and the taught position of the sensing point in a first task program, while associating the sensing instruction and the taught position of the sensing point with each other. The controller moves the tool to the taught position of the sensing point based on the sensing instruction stored in the first task program. When the tool is moved to the taught position of the sensing point, the acquisition means
performs detection tasks by the position detection sensor based on the sensing instruction, and acquires a work location for the workpiece based on a result of the detection. The second storage stores the acquired work location in a second task program or an external variable that can be referenced from the second task program. By executing the second task program, the tool is moved to perform the machining.

BRIEF DESCRIPTION OF THE DRAWINGS

FIG. 3 is a block diagram of a robot controller RC, a teach pendant TP, a sensor controller, and a laser sensor;

FIG. 6A is a flowchart of a teaching mode process;

FIG. 6B is a flowchart of sensing mode process;

FIG. 13 is an explanatory view of one example of a task program;

DETAILED DESCRIPTION OF THE PREFERRED EMBODIMENTS

The following will describe with reference to FIGS. 1 to 16 one specific embodiment of a programming method for an arc welding robot, a programming apparatus for an arc welding robot, and arc welding robot control system in accordance with the present invention. Hereinafter, an arc welding robot is simply referred to as a welding robot for convenient reference.

Figure 1:
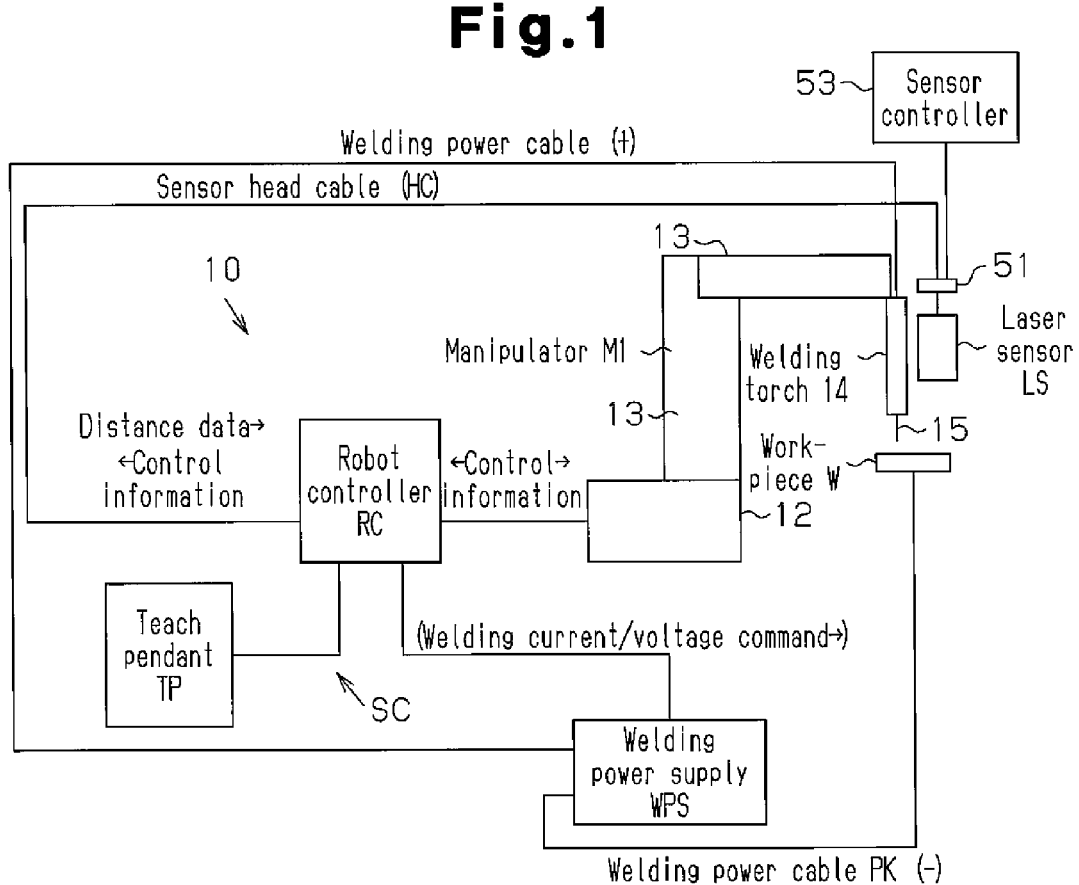
FIG. 1 is a block diagram of an arc welding robot control system according to one embodiment of the present invention.

As shown in FIG. 1, a welding robot control system 10 includes a teach pendant TP that program a position for a welding torch 14 with respect to a workpiece W as a work target and a robot controller RC that controls a manipulator M1 configured to perform welding. A task program creator SC is constituted with the teach pendant TP and the robot controller RC. The robot controller RC corresponds to robot control means.

The manipulator M1 includes a base member 12 to be fixed, for example, to a floor and a plurality of arms 13 coupled to each other via a plurality of shafts. The welding torch 14 is attached to a tip of the forefront one of the arms 13, that is, the wrist portion of the manipulator M1. The welding torch 14 contains a wire 15 as a welding material. The welding torch 14 generates an arc between the workpiece W and the tip of a wire 15 sent out by a feeder (not shown). Then, the welding torch 14 welds the wire 15 by heat due to the arc, thereby conducting arc welding on the workpiece W. Between the arms 13, a plurality of motors (not shown) are mounted. When the motors are driven, the welding torch 14 moves in a back and forth direction and a right and left direction. The back and forth direction means a direction in which the welding torch 14 moves along a welding seam, so that the forward direction is a direction in which the welding torch 14 advances and the backward direction is the opposite direction. The right and left direction agrees with that with respect to the advancement direction. The manipulator M1 is mounted at its tip with a laser sensor LS as a position detection sensor configured to detect a shape of the workpiece W.

The teach pendant TP is connected as a portable task unit to the robot controller RC. As shown in FIG. 3, the teach pendant TP includes a variety of keys such as a numeric keypad (not shown), a positioning instruction key (not shown), a sensing instruction key 31, and a mode selection key 32 as well as a keyboard (not shown) having a target angle setter 33 and an advance/retraction angle setter 34 configured to input a posture of the welding torch 14. The target angle setter 33 and the advance/retraction angle setter 34 both correspond to posture setting means. Further, the teach pendant TP is equipped with a display (not shown) constituted of a liquid crystal display (LCD). By operating the variety of keys (not shown), the target angle setter 33, and the advance/retraction angle setter 34, values of various kinds of taught data are input to the robot controller RC via a communication interface 35. By setting the teaching mode by operating the teach pendant TP and manually operating the various keys, the manipulator M1 is operated by the robot controller RC based on inputs through these keys, thereby moving the welding torch 14. The sensing instruction key 31 corresponds to sensing instruction input means.

The robot controller RC is constituted of a computer as shown in FIG. 3. That is, the robot controller RC is equipped with a central processing unit (CPU) 20, a rewritable ROM 21 configured to store a variety of programs in order to control the manipulator M1, a RAM 22 serving as a working memory, and a rewritable storage unit 23 constituted of nonvolatile memory configured to store various data. The CPU 20 corresponds to control means, acquisition means, coordinate setting means, torch posture calculation means, and mode type altering means.

Various taught data transmitted from the communication interface 35 in the teach pendant TP is input to the robot controller RC via a keyboard interface 24. The taught data is used in the robot controller RC in order to create a task program.

The storage unit 23 has storage regions such as a first storage region 23a and a second storage region 23b. The second storage unit 23 corresponds to first storage means and second storage means. The first storage region 23a stores distance information obtained by measuring a field of view (FOV) (see FIG. 9) by using the laser sensor LS. The second storage region 23b stores the first task program created in a teaching mode to be described later and the second task program created via a sensing mode.

The first task program (hereinafter referred to simply as a sensing program) stores the following taught data:
  position data at each taught position such as a sensing point;
  input values of a target angle and an advance/retraction angle sent from the target angle setter 33 and the advance/retraction angle setter 34; and
  parameters and various instructions such as a positioning instruction, a sensing instruction, and a welding start instruction input at each of the taught positions.

On the other hand, the second task program (hereinafter referred to simply as an execution program) stores the following taught data:
  a groove position data of a workpiece W acquired by the laser sensor LS at each sensing point and torch posture data at each groove position calculated based on a target angle and an advance/retraction angle input from the target angle setter 33 and the advance/retraction angle setter 34.

The groove position data and torch posture data (position/posture coordinate values) may as well be directly stored in the execution program or stored in an external variable that can be referenced from the execution program. Alternatively, the position/posture coordinate values may be configured so that it can be selected whether to directly store them in the execution program or store them in the external variable. In those cases, the external variable is also stored in the second storage region 23b. The following will describe the groove position data and then torch posture data with reference to a case where they will be directly stored in the execution program as an example.

The robot controller RC drives and controls the motors (not shown). Accordingly, the robot controller RC operates the manipulator M1 by driving a servo driver 25 in accordance with the sensing program in the sensing mode and with the execution program in the execution mode. The robot controller RC provides a welding power supply WPS (see FIG. 1) with welding conditions such as a welding current and a welding voltage. Then, the robot controller RC performs welding tasks by using power supplied from the welding power supply WPS via a power cable PK.

The laser sensor LS is a scanning type laser displacement sensor configured to measure a distance to the workpiece W through laser light emission and reception. The laser sensor LS is mounted on the tip of the wrist portion of the manipulator M1. The laser sensor LS is equipped with a light emitting unit 41 that emits laser light toward the workpiece W, a light reception unit 42 that received the laser light reflected by the workpiece W, and the like. Laser light emitted by the light emitting unit 41 is irregularly reflected by the workpiece W and received by the light reception unit 42. The light reception unit 42 is constituted of a CCD line sensor (line laser sensor). The light reception unit 42 measures distance to the workpiece W from the laser sensor LS in the field of view FOV.

Figure 2A:
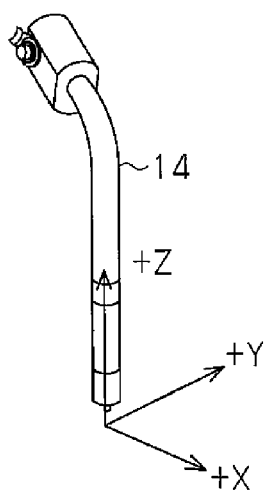
FIG. 2A is an explanatory view of a tool coordinate system.
Figure 2B:
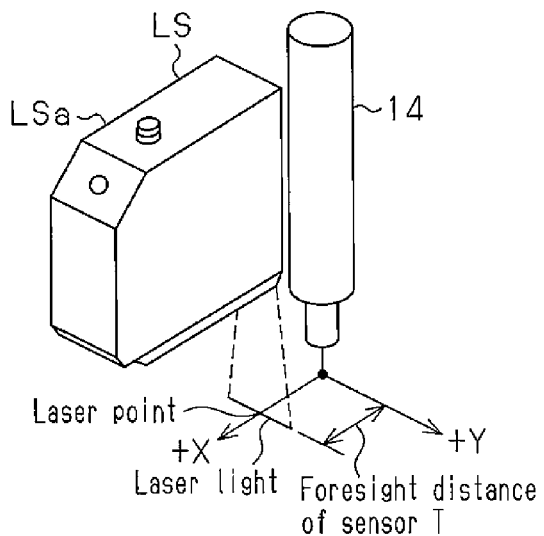
FIG. 2B is a perspective view showing a state in which a laser sensor LS is mounted on a welding torch.

A sensor head LSa of the laser sensor LS is disposed in such a manner that a laser illumination direction may be parallel with one of the axes of the tool coordinate system. FIG. 2A shows the welding torch 14 as a tool. In the tool coordinate system, the axis of the welding torch 14 is indicated as a Z-axis. In the present embodiment, it is set so that a direction in which laser light is applied from the sensor head LSa may agree with a Z-axial direction and that a welding torch 14 advancement direction may agree with an X-axial direction of the tool coordinate system as shown in FIG. 2B. Further, the laser sensor LS is disposed along an X-axis. The sensor head LSa shown in FIG. 2B applies laser light to a position separate from the tip of the welding torch 14 by a predetermined distance in the welding advancing direction. A distance up to a laser point in the tool coordinate system separate from the tip of the welding torch 14 by the predetermined distance in the welding advancement direction is referred to as a sensor foresight distance T.

The laser sensor LS is equipped with a central processing unit (CPU) 43, a ROM 44, a RAM 45, and a communication interface 46. The ROM 44 stores various programs such as a groove position measurement processing program, a groove reference angle measurement processing program, and a groove shape recognition processing program. The RAM 45 is a working memory used when those programs are executed.

The laser sensor LS is connected via the communication interface 46 to a communication HUB 52 in a sensor interface unit 51. The communication HUB 52 is connected to the communication interface 54 in the sensor controller 53. The HUB 52 is connected to the communication interface 26 in the robot controller RC via a sensor head cable HC.

The sensor controller 53 is equipped with a CPU 55, a ROM 56, and a RAM and a rewritable storage device 57, which are not shown. The storage device 57 is constituted of a hard disk, a rewritable semiconductor memory or the like. The storage device 57 stores a lot of groove recognition data which is used for groove recognition and corresponds to a groove shape and thickness of the workpiece W.

The ROM 56 stores a variety of software programs such as a program for realizing functions of the groove shape setter and a program for realizing functions of a thickness setter. When the keyboard (not shown) of the teach pendant TP is operated, a request concerning setting of a groove shape and thickness of a workpiece is input to the sensor controller 53 via the communication interfaces 35 and 26, the communication HUB 52, and the communication interface 54. Then, in response to the request, the groove shape and the thickness are set. Further, groove recognition data corresponding to the set groove shape and plate thickness is stored in the RAM 45 in the laser sensor LS via the communication interface 54, the communication HUB 52, and the communication interface 46. Hereinafter, "taught" refers to inputting through the teach pendant TP, unless otherwise specified.

A description will be given of actions of the welding robot control system 10 with reference to flowcharts in FIGS. 4 to 8.

Figure 4:
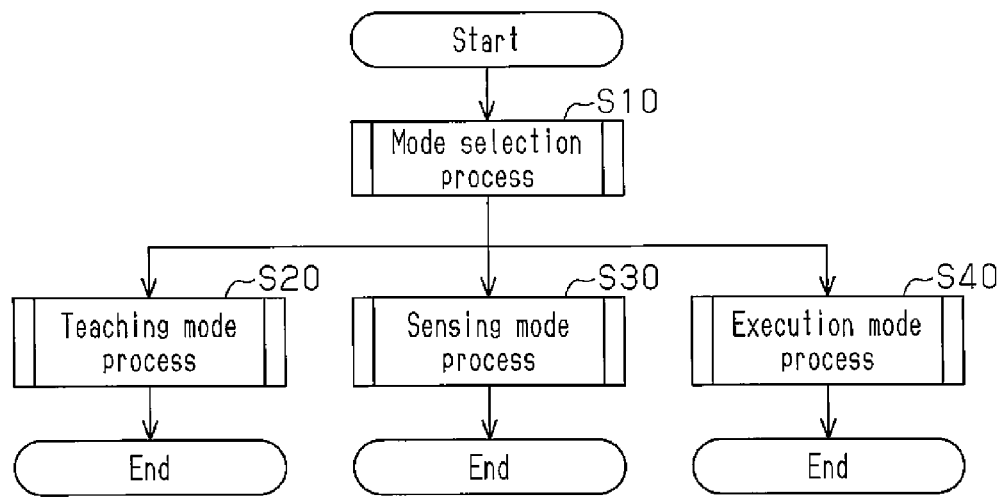
FIG. 4 is a flowchart showing a procedure in each mode.
Figure 5:
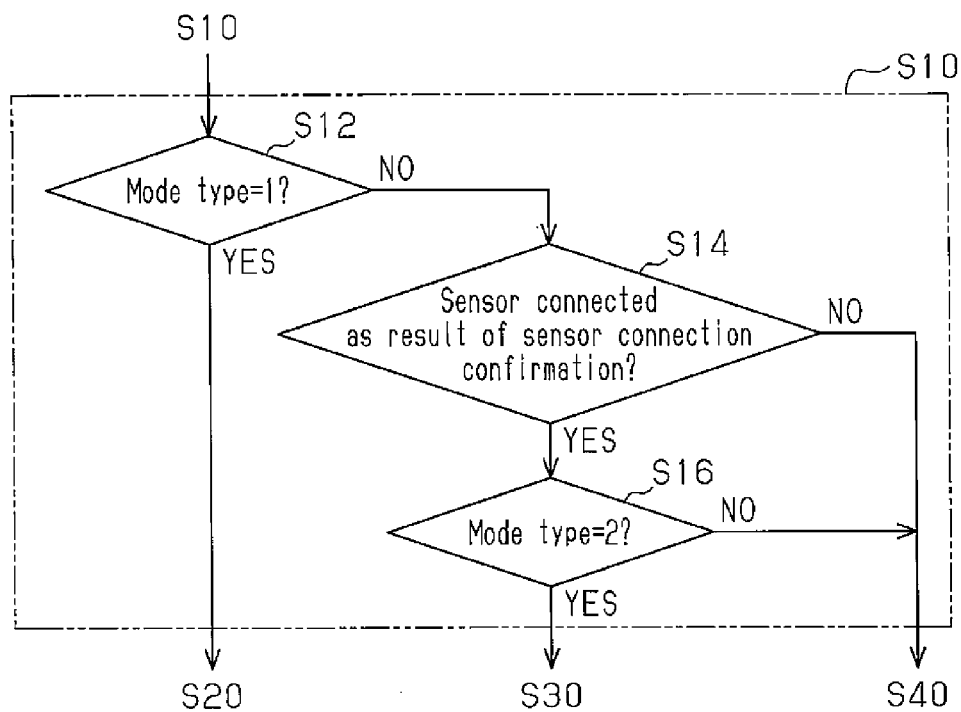
FIG. 5 is a flowchart of mode selection process.

As shown in FIG. 4, when the mode selection key 32 in the teach pendant TP is operated by the operator, mode selection/execution process at S10 is performed. The mode selection/execution process allows execution of a teaching mode process at S20, sensing mode process at S30, or execution mode process at S40.

At S12, the CPU 20 determines which one of the modes is selected, in accordance with the mode selection/execution processing program stored in the ROM 21. If the mode type is "1" at S12, the CPU 20 makes a determination in the affirmative ("YES"). That is, the CPU 20 determines that the teaching mode is selected and proceeds to S20. If the mode type is not "1", the CPU 20 makes a determination in the negative ("NO") and proceeds to S14.

At S14, the CPU 20 determines whether the laser sensor LS is connected via the sensor interface unit 51 to the communication interface 26, in accordance with a sensor connection confirmation processing program stored in the ROM 21. If the laser sensor LS is connected to the communication interface

26, the CPU 20 proceeds to S16. Otherwise, the CPU 20 determines that the execution mode is selected and proceeds to S40.

If the mode type is "2" at S16, the CPU 20 makes an affirmative determination ("YES"). That is, the CPU 20 determines that the sensing mode is selected and proceeds to S30. If the mode type is not "2", the CPU 20 makes a negative determination ("NO"). That is, the CPU 20 determines that the execution mode is selected and proceeds to S40.

(Teaching Mode Process: S20)

As shown in FIG. 6A, the operator manually operates the teach pendant TP to move the welding torch 14, thereby determining a teach position n (n=1, initially) at S21.

At S22, the operator turns on the positioning instruction key or the sensing instruction key 31 (not shown) on the teach pendant TP in a state where the welding torch 14 has moved to a desired teach position. If the sensing instruction key 31 is turned on, it corresponds to the first step. If the positioning instruction key is turned on, the CPU 20 makes a negative determination ("NO") at S22 and proceeds to S26. Then, the CPU 20 stores position coordinates of the teach position n in the second storage region 23b of the storage unit 23 based on a "positioning instruction". If the sensing instruction key 31 is turned on, a "sensing instruction" is input from the teach pendant TP as "positioning instruction and sensing point storing instruction". Therefore, the CPU 20 makes an affirmative determination ("YES") at S22 and proceeds to S23. At S23, the CPU 20 stores the input "sensing instruction" as well as the teach position n (position coordinates) as a sensing point in the second storage region 23b of the storage unit 23. The step of S23 corresponds to the second step. Hereinafter, a teach position where the "sensing instruction (function as the positioning instruction and sensing point storing instruction)" is issued is referred to as a sensing point teach position. Further, a taught position where the "positioning instruction" is issued using the positioning instruction key (not shown) is referred to as an approach point taught position.

At S24, the operator inputs a desired welding target angle from the target angle setter 33 in the teach pendant TP. The CPU 20 stores an input value of the target angle in the second storage region 23b of the storage unit 23 while associating the input value with the sensing point taught position n. Further, the operator inputs a desired welding advance/retraction angle from the advance/retraction angle setter 34 in the teach pendant TP. The CPU 20 stores an input value of the advance/retraction angle in the second storage region 23b of the storage unit 23 while associating the input value with the sensing point taught position n. In the present embodiment, although the values of both of the target angle and the advance/retraction angle have been input, the value of either one of them may be input. In the case of inputting either one of the target angle and the advance/retraction angle, the other may be stored in the storage unit 23 as a parameter and read at the step S24. Further, if there is any other instruction to be executed at the sensing point teach position at S24, the operator operates the various instruction keys (not shown) on the teach pendant TP, so that the CPU 20 stores those various instructions in the second storage region 23b while associating the instructions with the sensing point teach position. Although the key to be operated at S24 may be, for example, a "welding start instruction" or "welding end instruction", the present invention is not limited to it. Further, in the sensing point taught position, if various execution conditions for the execution mode as described later, for example, a welding current and a welding voltage are input through the numeric keypad, they are stored in the second storage region 23b while being associated with the sensing point taught position.

If there is a next taught position at S25, the procedure returns to S21, where the operator performs the similar tasks to manually operate the teach pendant TP to move the welding torch 14, thereby determining the next taught position. Then, similarly, the operator operates the teach pendant TP to input the "positioning instruction" or "sensing instruction" so that the taught position may be stored in the second storage region 23b. If there is no next taught position, the operator operates an end key (not shown) to end the teaching mode.

In such a manner, the second storage region 23b stores the approach point taught position and the sensing point taught position in the order in which they are taught. Moreover, the instructions such as the welding start instruction and the welding end instruction at the sensing point taught position and the various execution conditions are stored while being associated with the sensing point taught position, so that the later-described sensing program is formed. Further, when the end key is operated, the CPU 20 proceeds to S60 in accordance with the mode type switchover processing program stored in the ROM 21. Then, the CPU 20 performs the mode type changing process described below.

(Mode Type Changing Process: S60)

Next, a description will be given of the mode type changing process.

Figure 8:
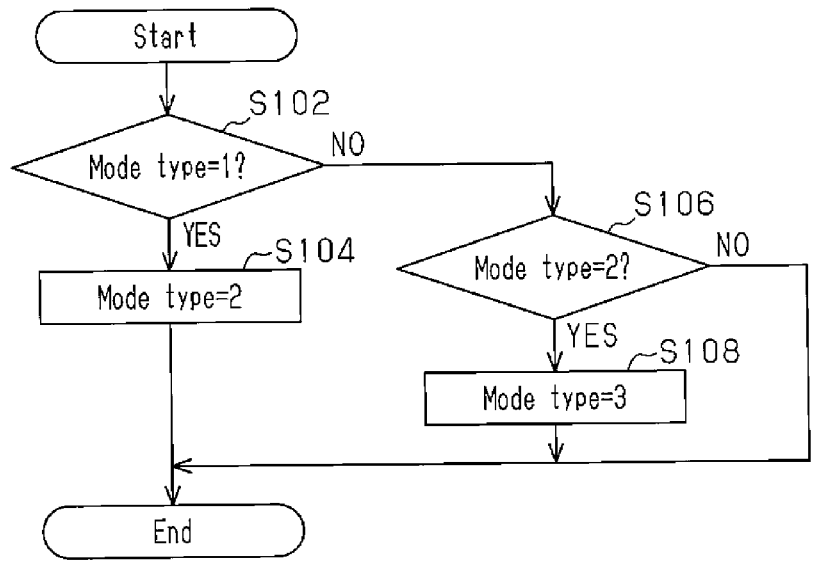
FIG. 8 is a flowchart of mode type switchover process.

FIG. 8 shows a flowchart of the mode type changing process. At S102, the CPU 20 determines whether the mode type in the previous mode process is "1". If the mode type is "1", the CPU 20 proceeds to S104 to select the mode type to "2" and then ends the present process. If the mode type is not "1", the CPU 20 proceeds to S106, to determine whether the mode type is "2". If the mode type is "2" at S106, the CPU 20 proceeds to S108, to select the mode type to "3" and then ends the present process. If the mode type is not "2", the CPU 20 directly ends the present process.

(Sensing Mode Process: S30)

The sensing mode process will be described with reference to FIG. 6B. The sensing mode process is a process for executing a sensing program created in the teaching mode.

At S31, the CPU 20 moves the manipulator M1 based on the "positioning instruction" or the "sensing instruction" associated with each of the taught positions. The teach positions n (n=1, 2, . . . ) are stored in the second storage region 23b in order in which they are taught. The CPU 20 reads only one of the taught positions n in the order in which they are taught and moves the welding torch 14 to the read teach position. An initial value of the taught position n is 1 (n=1). S31 constitutes part of the third step.

If the taught position to which the welding torch 14 is moved is a sensing point at S32, the CPU 20 proceeds to S33. If the taught position to which the welding torch 14 is moved is an approach point, the CPU 20 proceeds to S35. At S33, the CPU 20 outputs a laser emitting instruction to the laser sensor LS by utilizing the sensing execution processing program stored in the ROM 21 if the sensing point teach position n based on the "sensing instruction" is 1. The CPU 43 in the laser sensor LS controls the light emitting unit 41 so that it may apply laser light based on the laser emitting instruction. Then, the CPU 43 measures a groove position in the sensor coordinate system by utilizing the groove position measurement process for the laser sensor LS. Further, the CPU 43 measures a groove reference angle $\theta_{SA}$ in the sensor coordinate system by utilizing the groove reference angle measurement process. The groove reference angle $\theta_{SA}$ will be described later.

(Groove Position Measurement Process)

Figure 9:
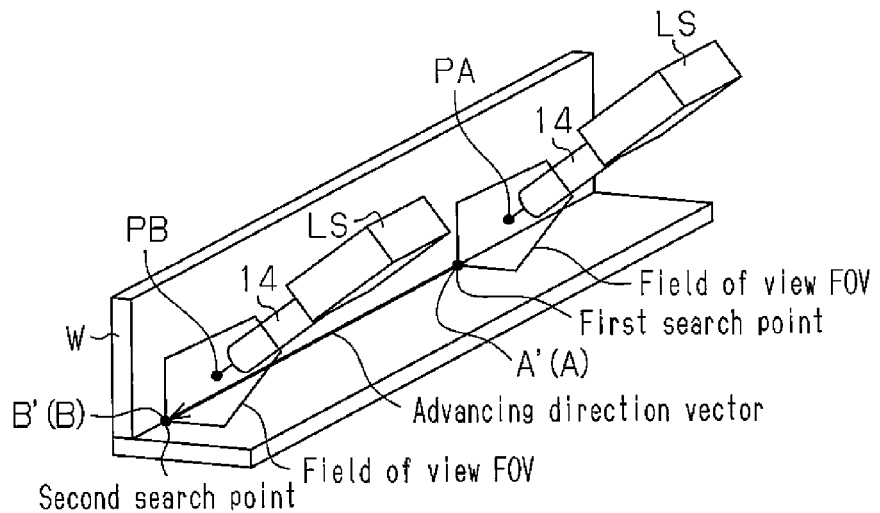
FIG. 9 is an explanatory view of groove position detection.

As shown in FIG. 9, the groove position measurement process detects a groove position A in the sensor coordinate system at a sensing point PA. An FOV shown in FIG. 9 indicates a field of view of the laser sensor LS. The laser sensor LS measures the groove position, which is the position of a characteristic site of a workpiece, based on information of a distance from the field of view FOV. When the groove is being detected, that is, when the welding torch 14 is positioned at the sensing position PA, the manipulator M1 is at rest. The groove position measurement process is carried out to detect a welding start point and a welding end point, for example. In the present embodiment, the sensing point PA provides a teach position where the welding start point is to be detected. The CPU 20 sets to the groove position A (first search point) a point obtained by transforming the sensing point PA into a point in the sensor coordinate system by using a transformation matrix $_T T_C$ and then shifting it by a foresight distance T.

The transformation matrix will be described below.

Figure 12:
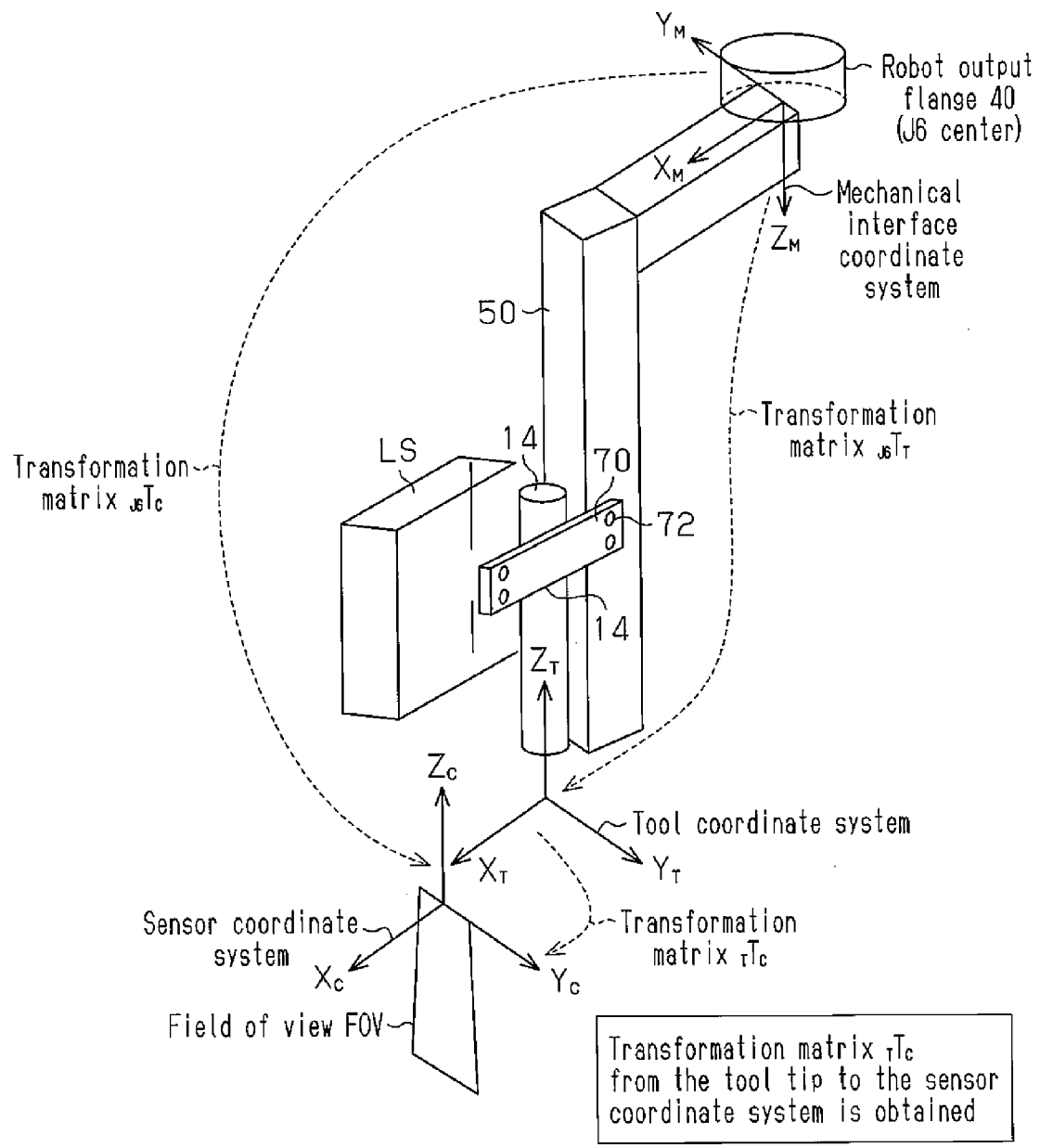
FIG. 12 is an explanatory view of a relationship among a tool coordinate system, a sensor coordinate system, and a mechanical interface coordinate system.

FIG. 12 shows relationship among the tool coordinate system, the laser sensor LS, the sensor coordinate system, and the mechanical interface coordinate system about the welding torch 14 as a tool. As shown in FIG. 12, the welding torch 14 is attached to an output flange 40 of the manipulator M1 via a bracket 50. Further, the laser sensor LS is attached via a clamp 70 to the bracket 50 fitted to the manipulator M1. The clamp 70 is attached to the bracket 50 with a volt 72. To obtain the posture of a robot at the groove position, the transformation matrices $_T T_C$ for the tool coordinate system and the sensor coordinate system are required.

If the manipulator M1 constitutes a six-axis robot, $_{J6} T_C$ is a transformation matrix for transforming the mechanical interface coordinate system ($X_M, Y_M, Z_M$) having the output flange 40 at the center of the sixth axis of the robot as its origin to the sensor coordinate system ($X_C, Y_C, Z_C$). The transformation matrix for transforming the mechanical interface coordinate system ($X_M, Y_M, Z_M$) to the tool coordinate system ($X_T, Y_T, L_T$) is $_{J6} T_T$. The transformation matrix for transforming the tool coordinate system to the sensor coordinate system is $_T T_C$.

In this case, the transformation matrix to the sensor $_T T_C$ as viewed from the tool coordinate system is obtained as follows:

$$_T T_C = (_{J6} T_T)^{-1} \times {_{J6} T_C} \qquad \text{(Expression 1)}$$

Now, get back to S33 in the flowchart (FIG. 6B). The CPU 43 cross-checks the groove recognition data stored in the RAM 45 from the sensor controller 53 and the result from light reception by the light reception unit 42 with each other, thereby performing a groove shape recognition process. The groove shape recognition process is publicly known and so its explanation is omitted.

The CPU 43 transmits the groove position A and the groove reference angle $\theta_{SA}$ in the sensor coordinate system to the robot controller RC via the sensor interface unit 51 and the communication interface 26. The CPU 20 in the robot controller RC saves the groove position A and the groove reference angle $\theta_{SA}$ in the sensor coordinate system into the second storage region 23b while associating them with the taught position.

At S33, the various execution conditions created in the teaching mode and the various instructions such as the welding start instruction and the welding end instruction are written in the sensing program. However, in the sensing mode, any instructions other than the "positioning instruction" and the "sensing instruction" are ignored by the CPU 20. S33 corresponds to part of the third step.

At S34, the CPU 20 determines whether there is a next taught position n+1. In the case of "YES", the CPU 20 returns to S31, to perform a process similar to the previous process also on the next taught position. For example, if the process proceeds from S32 to S33 in a state where the groove position A is detected, the groove position measurement process configured to detect a groove position B in the sensor coordinate system that provides a welding end point is performed to a sensing point PB in the same way as in the case of the first search point at S33. If the welding end point is detected, the groove reference angle measurement process to be described later is omitted. The groove position B provides the second search point shown in FIG. 9. In the present embodiment, for ease of explanation, there is no next welding zone. Accordingly, the groove reference angle measurement process has been omitted if the welding end point was detected, the groove reference angle measurement process need not be omitted in the case of changing a posture of the torch in the next welding zone.

The CPU 43 transmits the groove position B obtained as a result of measurement to the robot controller RC via the communication interface 46, the sensor interface unit 51, and the communication interface 26. The CPU 20 in the robot controller RC saves the groove position B in the second storage region 23b while associating the groove position B with the taught position. If there is no next taught position at S34, the CPU 20 proceeds to S35.

At S35, if the sensing points PA and PB each have the sensing data (groove position, groove reference angle) as a result of the process in S33, the CPU 20 performs tool coordinate system transformation process, welding seam coordinate system setting process, target angle posture value calculation process, and advance/retraction angle posture value calculation process. Hereinafter, for ease of explanation, a case will be described in which there are two groove positions. The same process will be performed even in a case where there are at least three groove positions.

(Tool Coordinate System Transformation Process)

The CPU 20 transforms the groove positions A and B in the sensor coordinate system to groove position coordinates A' and B' in the tool coordinate system. Then, the CPU 20 replaces the sensing points PA and PB with the updated groove position coordinates A' and B' of the tool coordinate system respectively in a copy of the sensing program stored in the second storage region 23b. A task program in progress of updating is used as the later-described execution program after the updating.

(Welding Seam Coordinate System Setting Process)

Figure 11A:
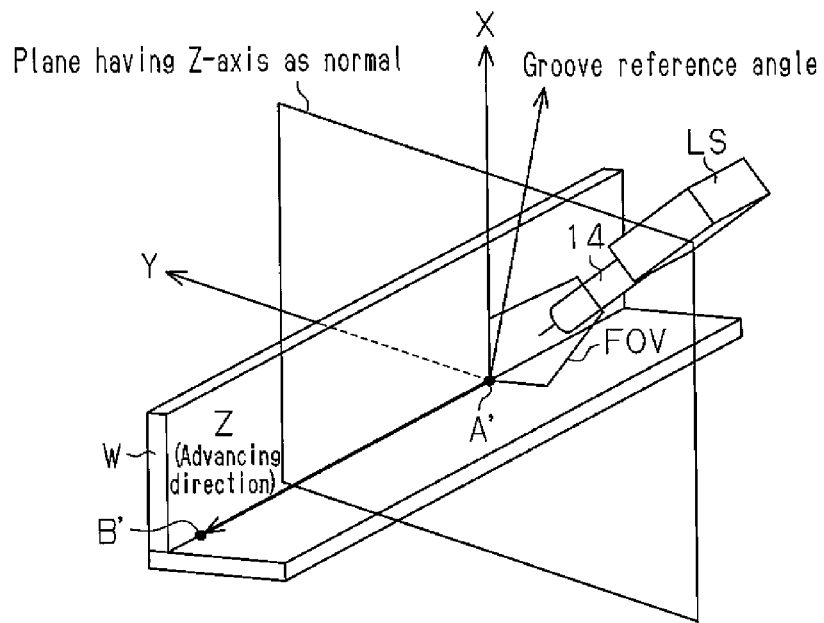
FIG. 11A is an explanatory view a welding seam coordinate system.
Figure 11B:
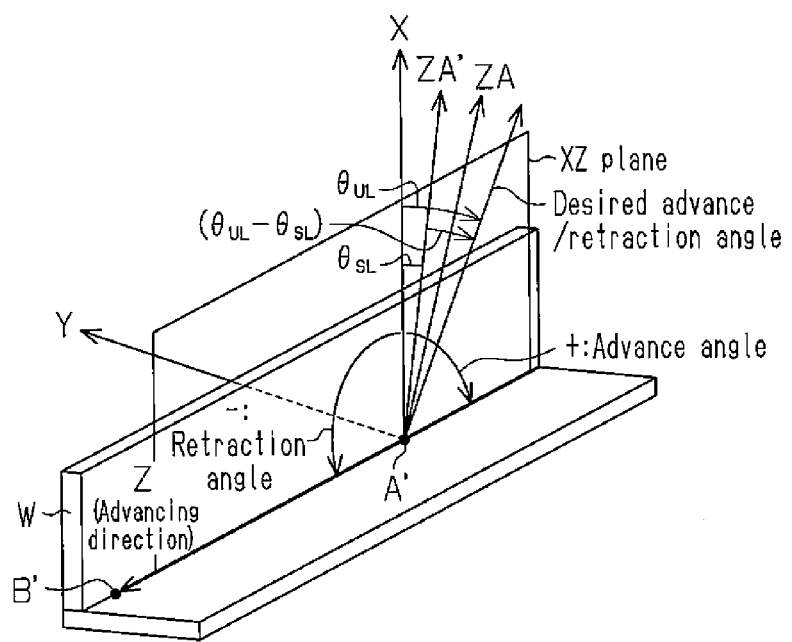
FIG. 11B is an explanatory view an advance/retraction angle.

As shown in FIG. 11A, the following vector along a welding advancing direction including the groove positions A' and B' is assumed to be a Z-axis of the welding seam coordinate system:

$\overrightarrow{A'B'}$

An X-axis is obtained by projecting the groove reference angle $\theta_{SA}$ onto a plane having the Z-axis as its normal. The groove reference angle $\theta_{SA}$ can be obtained by a publicly known method based on the distance information from the field of view FOV. A single Y-axis is determined in accordance with a right-handed system of the welding seam coordinate system. From a sensor coordinate system $Y_C$-$Z_C$ (see FIG. 12) of the laser sensor LS, the groove reference angle $\theta_{SA}$ is calculated which is an angle formed by $Z_C$ and the groove normal. Although the method for calculating a lap joint has been described, any other joints can be calculated by a publicly known technology.

(Target Angle Posture Value Calculation Process)

A description will be given of a process for calculating a target angle posture value.

Figure 10:
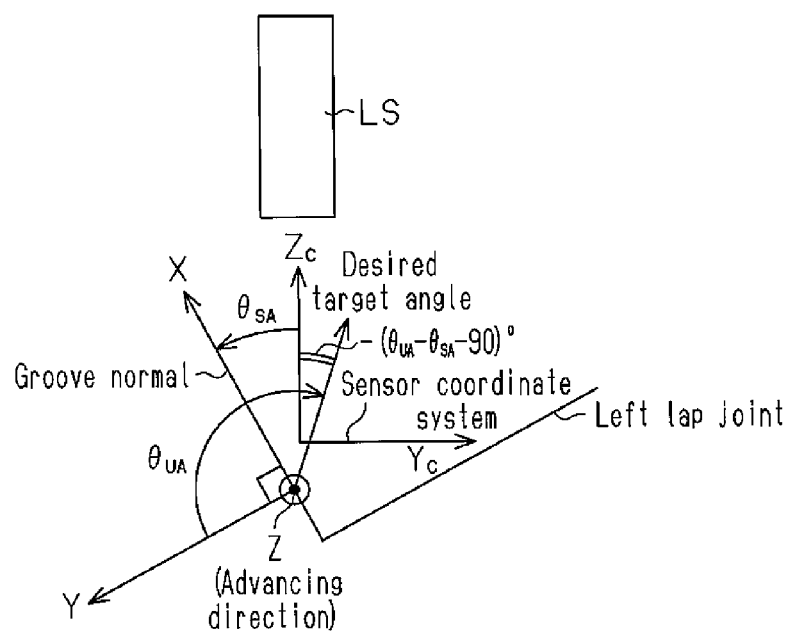
FIG. 10 is an explanatory view of a target angle.

As shown in FIG. 10, the CPU 20 sets a coordinate system having a groove normal as its X-axis, a surface of the workpiece W as its Y-axis, and a welding direction as its Z-axis on a workpiece W imaged by the laser sensor LS. The CPU 20 calculates a target angle posture value as a left-handed angle around the Z-axis, assuming the Y-axis to be a reference (zero degrees). That is, assuming $\theta_{UA}$ to be a target angle set value and the groove reference angle $\theta_{SA}$ to be an angle of the X-axis projected onto the aforesaid plane of the groove normal with respect to the $Z_C$ axis of the sensor coordinate system, the CPU 20 calculates $-(\theta_{UA}-\theta_{SA}-90)$ as the target angle posture value around the Z-axis of the welding seam coordinate system. In such a manner, the value of the target angle posture among the welding torch postures is obtained.

(Advance/Retraction Angle Posture Value Calculation Process)

In the advance/retraction angle posture value calculation process, the CPU 20 calculates an advance/retraction angle posture value. Specifically, assuming that a posture perpendicular to the Z-axis in the groove position coordinate system A' is a reference (zero degrees), an advance/retraction angle posture value is obtained in a right-handed angle around the Y-axis. That is, assuming that the Z-axis in the tool coordinate system of A' (point) in the groove position coordinate system is $Z_A$ and a $Z_A'$-axis is obtained by projecting the $Z_A$-axis onto the XZ plane in the welding seam coordinate system, the advance/retraction angle posture value is obtained as follows. Assuming that $\theta_{UL}$ is a desired advance/retraction angle, that is, an advance/retraction angle set value and $\theta_{SL}$ is an angle of $Z_A'$ around the Y-axis with respect to the X-axis in the welding seam coordinate system, the CPU 20 calculates an advance/retraction angle posture value $(\theta_{UL}-\theta_{SL})$ around the Y-axis in the welding seam coordinate system. In such a manner, the advance/retraction angle posture value among the welding torch postures is obtained.

The target angle posture value and the advance/retraction angle posture value are associated as a welding torch work posture at the groove position coordinates A' in the task program in progress of updating stored in the second storage region 23b. S35 corresponds to part of the third step. In this case, the later-described execution program is generated in the second storage region 23b. The execution program stores the various instructions (including the welding start instruction, the welding end instruction, and the like) at sensing point teach positions and the various execution conditions, while associating the instructions and the conditions with the sensing point teach positions and the groove position coordinates A' and B'. After the process in S35 ends, the CPU 20 proceeds to the mode type changing process in S70. The mode type changing process in S70 is the same as that in S60 and so its explanation is not repeated here.

(Execution Mode Process: S40)

Figure 7:
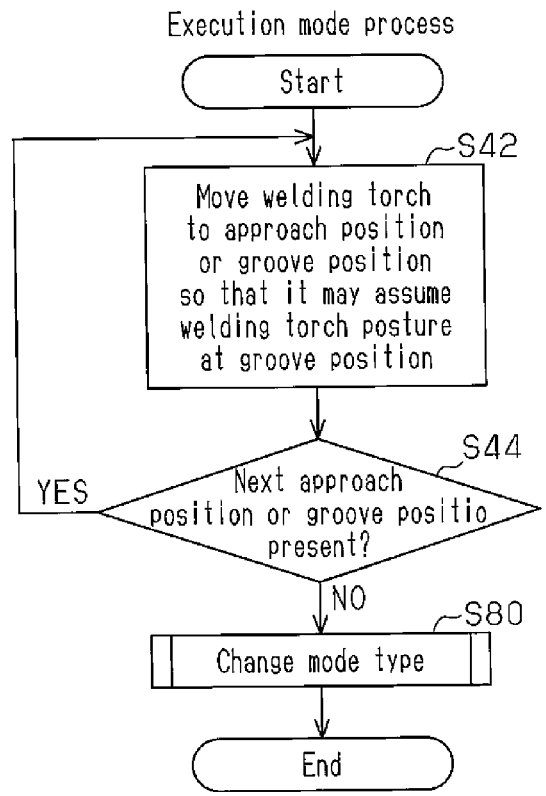
FIG. 7 is a flowchart of performing mode process.

Next, a description will be given of the execution mode process with reference to FIG. 7. The execution mode process executes a program automatically generated in the sensing mode.

At S42, the CPU 20 moves the manipulator M1 based on the "positioning instruction" or the "sensing instruction" to move the welding torch 14 to an approach position or a groove position in accordance with the execution program. In this case, if it is to be moved to the groove position, the CPU 20 moves the welding torch 14 in a posture having the desired target angle posture value and advance/retraction angle posture value associated with the groove position and also executes the various instructions associated with the groove position. For example, if the welding start instruction and a weaving start instruction are taught, the CPU 20 executes them based on the various execution conditions associated with the groove position.

At S44, if the execution program has the next approach point or groove position in it, the CPU 20 returns to S42. If the execution program has no next approach point or groove position, the CPU 20 proceeds to the mode type changing process in S80. The mode type changing process in S80 is the same as that in S60 and so its explanation is not repeated here.

(Example of Execution Program)

Next, a description will be given of an example of the execution program taught and generated in the teaching mode with reference to FIGS. 13 to 16. Although the following will describe a fillet joint constituted of a pair of L-plates made of iron as the workpiece W, the joint to be used is not limited to it.

(Teaching Mode)

Figure 14:
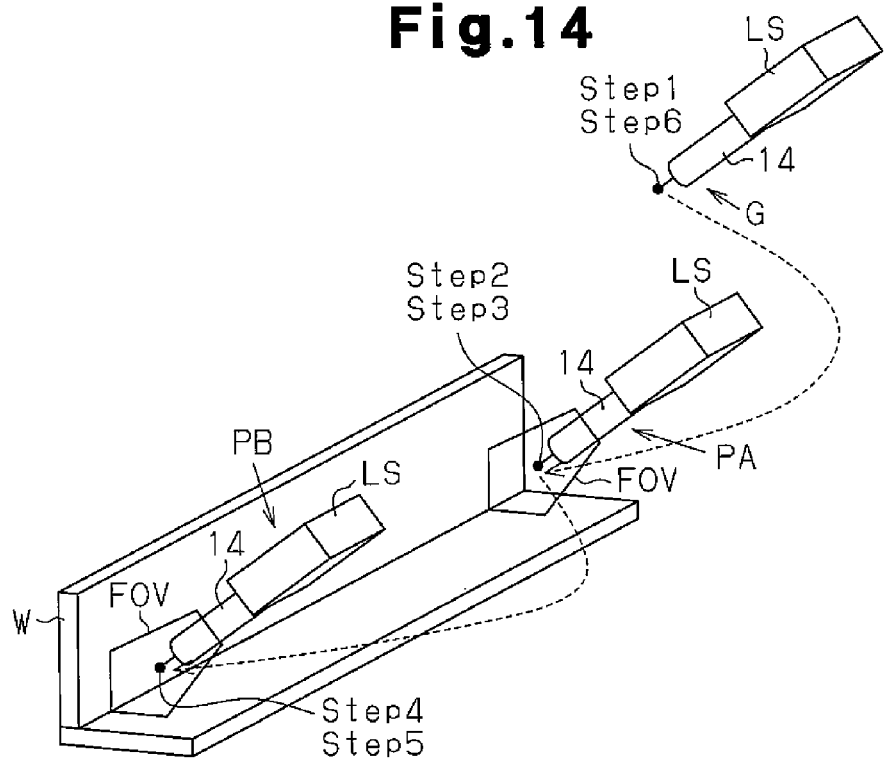
FIG. 14 is an explanatory view of positions of the laser sensor and a welding torch in a teaching mode.

In the teaching mode, the operator operates the teach pendant TP to drive the manipulator M1, thereby moving the welding torch 14 to a home position G, the sensing points PA and PB where the groove of the workpiece W is detected, and the home position G in this order as shown in FIG. 14. Then, by storing those positions as teaching steps, a sensing program is created. Further, the operator inputs necessary taught data at each of the teaching steps. The data taught in each of the steps will be described later.

Instructions at teaching steps No. 1 through No. 7 in FIG. 13 have been taught for the workpiece W in FIG. 14. Teaching step 1 is the home position G for the welding torch 14 which is set so that the workpiece W may be approached as shown in FIG. 14. After moving the welding torch 14 to this position, the operator inputs the "positioning instruction" from the teach pendant TP.

Teaching step 2 is the sensing point PA for detecting a welding start point on the groove of the workpiece W. After the welding torch 14 is moved to the sensing point PA, the "sensing instruction" is input. At the next teaching step 3, the "welding start instruction" is input. Teaching step 4 is the sensing point PB for detecting a welding end point on the groove of the workpiece W. After the welding torch 14 is moved to the sensing point PB, the "sensing instruction" is input. At the next teaching step 5, the "welding end instruction" is input.

Teaching step 6 is assumed to the same as the home position G. After shunting the welding torch 14 from the workpiece W as shown in FIG. 14, the operator inputs the "positioning instruction". In such a manner, a sensing program is created. In the present example, besides those instructions, the various execution conditions may be input together. The present invention features that the sensing points can be taught roughly because the groove position only needs to be in the field of view FOV of the laser sensor LS.

In the next sensing mode, the CPU 20 drives and controls the manipulator M1 in accordance with the aforesaid sensing program created in the teaching mode.

(Sensing Mode)

Figure 15:
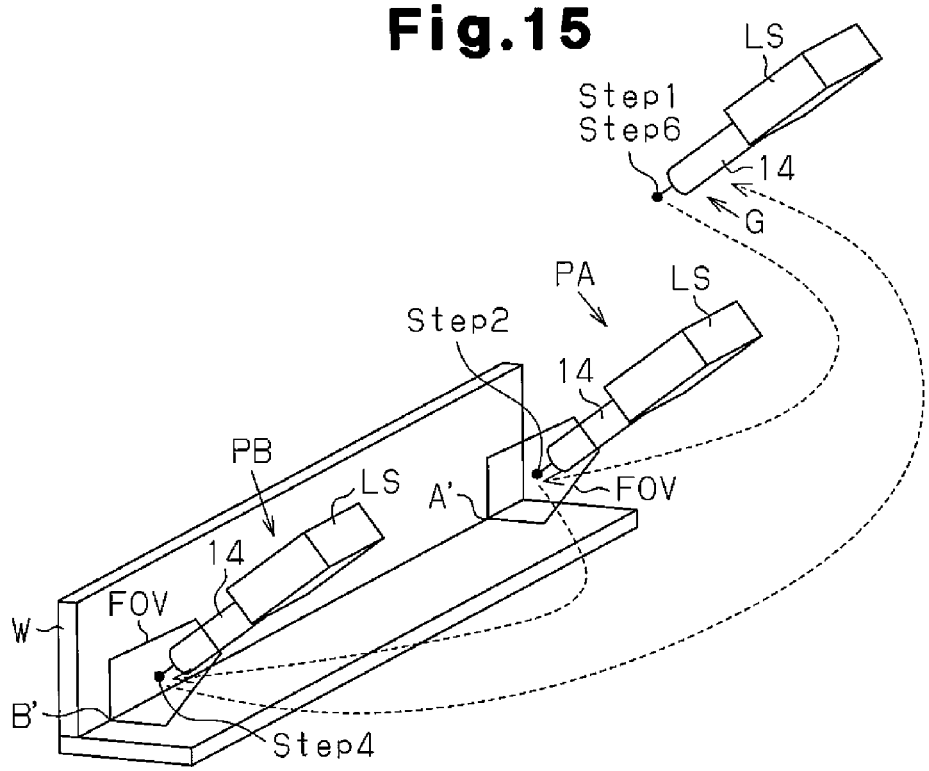
FIG. 15 is an explanatory view of positions of the laser sensor and a welding torch in the sensing mode.

At teaching step 1 shown in FIG. 15, the CPU 20 moves the welding torch 14 to the home position G in accordance with the "positioning instruction". At teaching step 2, in accordance with the "sensing instruction", the CPU 20 moves the welding torch 14 to the sensing point PA for detecting the groove position as shown in FIG. 15. At teaching step 2, in accordance with the "sensing instruction", the CPU 20 performs sensing tasks by using the laser sensor LS, thereby acquiring groove position coordinates A' and a groove reference angle $\theta_{SA}$. Then, the CPU 20 performs the tool coordinate system transformation process, the welding seam coordinate system setting process, the target angle posture value calculation process, and the advance/retraction angle posture value calculation process based on the various programs stored in the ROM 21. The CPU 20 ignores the welding start instruction at the following teaching step 3.

At teaching step 4, in accordance to the "sensing instruction", the CPU 20 moves the welding torch 14 to the sensing point PB for detecting a groove position as shown in FIG. 15. Further, at teaching step 4, in accordance with the "sensing instruction", the CPU 20 performs sensing tasks by using the laser sensor LS, thereby acquiring groove position coordinates B'. The CPU 20 ignores the welding end instruction at the following step 5. At teaching step 6, in accordance to the "positioning instruction", the CPU 20 moves the welding torch 14 to the home position G. In such a manner, an execution program is created. The present invention features that in the next execution mode, the CPU 20 drives and controls the manipulator M1 as follows in accordance with the execution program automatically created in the sensing mode.

Before proceeding to the execution mode, the operator once operates the teach pendant to stop the TP robot and removes the laser sensor LS shown in FIG. 12 from the bracket 50. This can be applied to a case where a workpiece to be machined in the execution mode has little displacement or dimension errors. That is, the laser sensor may well be removed at a point in time when acquisition of the groove shape and generation of the taught data by use of the laser sensor LS in the sensing mode have been completed. That is, the laser sensor LS is used only when creating an execution program in the sensing mode. This permits one laser sensor to be shared in use by a plurality of robots, thereby reducing costs for the facilities greatly.

(Execution Mode)

Figure 16:
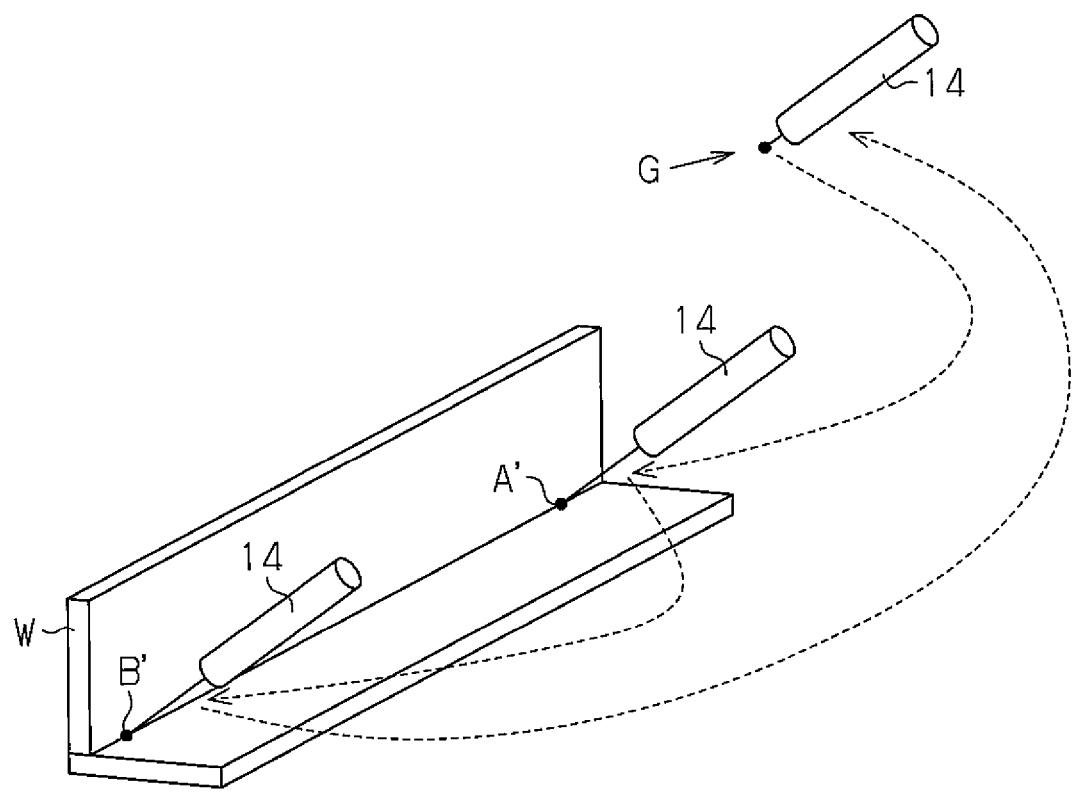
FIG. 16 is an explanatory view of a position of the welding torch in a performing mode.

At teaching step 1 shown in FIG. 16, the CPU 20 moves the welding torch 14 to the home position G in accordance with the "positioning instruction". At teaching step 2, in accordance to the "sensing instruction", the CPU 20 moves the tip of the welding torch 14 to the groove position A' in a welding torch posture having a target angle posture value and an advance/retraction angle posture value calculated in the sensing mode.

After moving the tip of the welding torch 14 to the groove position A', the CPU 20 starts welding based on the welding start instruction at the following teaching step 3. At teaching step 4, in accordance with the "sensing instruction", the CPU 20 moves the tip of the welding torch 14 to the groove position B' in a posture at a time when it is positioned to the groove position A'. After moving the tip of the welding torch 14 to the groove position A', the CPU 20 ends welding based on the welding end instruction at the following teaching step 5. At teaching step 6, the CPU 20 moves the welding torch 14 to the home position G in accordance to the "positioning instruction".

The aforesaid programming method for a robot, programming apparatus for a robot, and welding robot control system 10 give the following characteristics.

(1) According to the programming method for a robot, at S22 as the first step, each time the welding torch 14 (tool) moves to the sensing point PA or PB, the sensing instruction is input. At S23 as the second step, in response to inputting of the sensing instruction, the sensing instruction as well as the taught positions at the sensing points PA and PB are stored in the first task program, while being associated with each other. At the third step, the manipulator M1 moves to the sensing point PA or PB stored in the first task program as associated with the sensing instruction. When the welding torch 14 moves to the sensing point PA or PB, the laser sensor LS performs detection tasks based on the sensing instruction. Accordingly, the workpiece groove position is acquired and the groove position of the workpiece W is stored in the second task program while being associated with the sensing instruction. Then, in response to the sensing instruction included in the second task program, the welding torch 14 of the manipulator M1 moves to the groove position of the workpiece W.

As a result, it is only necessary to provide teaching tasks roughly in an environment free of displacements on the workpiece W, so that the teaching tasks can be simplified. Further, the subsequent welding tasks (actual tasks) by use of the welding torch 14 need not use the laser sensor LS, so that the cycle time for the actual tasks can be shortened. Further, it is unnecessary to teach the tasks so that the tip of the welding torch 14 may strictly agree with the groove position of the workpiece W. Accordingly, during welding by the welding torch 14, only by teaching the teaching tasks roughly, the tip of the welding torch 14 can be moved to the groove position of the workpiece W. Further, according to the present method, the sensing instruction is capable of automatically selecting any one of (a) storage of a teach position of the sensing point, (b) movement to the sensing point, and (c) acquisition and storage of a sensed groove position. Therefore, mode confirmation and complicated teaching are unnecessary. Accordingly, a task program can be created free from cases of making mistakes, facilitating the teaching tasks.

(2) According to the programming method for a robot, detection tasks by the laser sensor LS (position detection sensor) are performed in the sensing mode based on the first task program created in the teaching mode, and further, based on a result of the detection, the second task program is created. Resultantly, in the second task program, the tip of the welding torch 14 strictly agrees with the characteristic site position of the workpiece W. Therefore, in the execution mode for executing the second task program, the detection tasks by the laser sensor LS are unnecessary, thereby enabling shortening the cycle time for the actual tasks.

(3) According to the programming method for a robot, at the first step, when the welding torch 14 has moved to a sensing point, values of both of a target angle and an advance/retraction angle are input. At the second step, both of the target angle and the advance/retraction angle are stored in the storage unit 23 while being associated with the taught position. Further, at the third step, welding seam coordinates are set by an orientation vector (advancing direction vector) based on the acquired plurality of characteristic sites, so that a posture of the welding torch having the welding seam coordinates is calculated based on the target angle and the advance/retraction angle. Then, the posture of the welding torch 14 is stored in the second task program. As a result, in the programming method for the welding robot, when values of both of a target angle and an advance/retraction angle are input, a desired posture for the welding torch 14 can be obtained according to the input values of both of the target angle and the advance/retraction angle.

(4) The programming apparatus includes the sensing instruction key 31 (sensing instruction input means) for inputting the sensing instruction each time the welding torch 14 moves to a sensing point, and the storage unit 23 that stores the sensing instruction and a taught position at the sensing point while associating them with each other based on the sensing instruction. Further, the programming apparatus includes the CPU 20 (control means) that moves the manipulator M1 to the taught position at the sensing point associated with the sensing instruction in the first task program stored in the storage unit 23. Further, the programming apparatus includes the CPU 20 (acquisition means) that, when the welding torch 14 is moved to a taught position at a sensing point, detects the laser sensor LS based on the sensing instruction to acquire a groove position of the workpiece W based on a result of the detection. Further, the programming apparatus includes the storage unit 23 (second storage means) that incorporates and stores the acquired groove position of the workpiece W in the second task program for the robot while associating the groove position with the sensing instruction.

As a result, the teaching tasks can be simplified in an environment free of workpiece displacements. Further, the subsequent actual welding tasks by the welding torch 14 need not use the laser sensor LS, so that the cycle time for the actual tasks can be shortened. Further, it is unnecessary to teach the tasks so that the tip of the welding torch 14 may strictly agree with a position of the characteristic site of the workpiece. Accordingly, during the actual tasks by the tool, only by providing the teaching tasks roughly, the tip of the tool can be moved to the characteristic site position of the workpiece. Further, according to the present programming apparatus, the sensing instruction is capable of automatically selecting any one of (a) storage of a teach position of the sensing point, (b) movement to the sensing point, and (c) acquisition and storage of a sensed groove position. Therefore, mode confirmation and complicated teaching are unnecessary. Accordingly, an task program can be created free from case of making a mistake, facilitating the teaching tasks.

(5) According to the present programming apparatus, detection tasks by the laser sensor LS are performed in the sensing mode based on the first task program created in the teaching mode, so that based on a result of the detection, a second task program is created. In the second task program, the tip of the welding torch 14 strictly agrees with the characteristic site position of the workpiece W. That is, in the execution mode for executing the second task program, the detection tasks by the laser sensor LS are unnecessary, so that the cycle time during the actual tasks can be shortened.

(6) The programming apparatus includes the target angle setter 33 and the advance/retraction angle setter 34 (posture setting means). The target angle setter 33 and the advance/retraction angle setter 34 sets a target angle and an advance/retraction angle, respectively, when the welding torch 14 is moved to a sensing point. The storage unit 23 stores both of the target angle and the advance/retraction angle while associating them with the taught position at the sensing point. The CPU 20 functions as coordinate setting means configured to set welding seam coordinates by using an advancing direction vector (orientation vector) based on tool coordinates of the acquired groove position. The CPU 20 functions as torch posture calculation means configured to calculate a welding torch posture of the welding torch 14 having the welding seam coordinates based on the target angle and/or the advance/retraction angle. The storage unit 23 stores the posture of the welding torch 14 in the second task program. As a result, according to the programming apparatus, a desired posture for the welding torch 14 can be obtained by inputting values of both of the target angle and the advance/retraction angle.

(7) The CPU 20 functions as mode type changing means configured to automatically select the mode type to the sensing mode at a time when the teaching mode has ended. As a result, the sensing mode is automatically executed, so that mode selection tasks by the operator can be omitted.

(8) In the programming apparatus, the laser sensor LS is supported detachably on the manipulator M1. As a result, teaching tasks in the teaching mode can be simplified in an environment free from displacements on the workpiece W, and further, the position detection sensor is unnecessary in actual tasks by the tool. Therefore, the position detection sensor can be removed from the manipulator M1. This permits one laser sensor to be shared in use by a plurality of robots, thereby reducing costs for the facilities greatly.

Conventionally, the position detection sensor such as a laser sensor has always been mounted on the manipulator M1, and therefore the position detection sensor itself has had an influence on the posture of the tool during actual tasks. That is, the position detection sensor itself has been an interfering object, so that the tool itself has sometimes been impossible to assume a desired posture during the actual tasks. In contrast, the present invention eliminates the necessity of the position detection sensor such as the laser sensor and so can solve those problems.

(9) The robot control system includes the programming apparatus and the robot controller RC (robot control means) configured to execute a task program. The robot controller RC moves the welding torch 14 of the manipulator M1 to a groove position of the workpiece W in response to the sensing instruction included in the second task program in the execution mode. That is, by the present system, the tool of the manipulator can be moved to the characteristic site position of the workpiece in the execution mode in accordance with the second task program created by the programming apparatus.

Further, by the present system, the sensing instruction is capable of automatically selecting any one of (a) storage of a taught position for the sensing point, (b) movement to the sensing point, (c) acquisition and storage of a sensed groove position, and (d) movement to the sensed groove position. Therefore, mode confirmation and complicated teaching are unnecessary. Accordingly, a task program can be created free from cases of making mistakes, facilitating the teaching tasks.

(10) The CPU 20 (mode type changing means) automatically selects the mode type to the execution mode when the sensing mode ends. Further, the CPU 20 permits the second task program to be executed in the execution mode based on the mode type. As a result, it is possible to automatically proceed from the present mode to the execution mode based on a result of the decision made by the CPU 20.

(11) It is possible to automatically determine a mode to be executed based on the teaching/sensing/execution mode type and whether the laser sensor LS is connected, thereby executing a process in accordance with the executed mode.

The present embodiment may be changed as follows.

In the above embodiment, the laser sensor LS may be a scanning type laser displacement sensor for scanning by applying laser light to a mirror.

In the above embodiment, the laser sensor LS as the position detection sensor may be replaced with a general-purpose distance sensor, contact sensor, and the like.

In the above embodiment, the present invention may be embodied in a programming method for a spot welding robot, programming apparatus, and spot welding robot control system. Further, the present invention may be embodied a programming method for a painting robot, programming apparatus for a robot, and painting robot control system. In this case, the welding torch is replaced with a painting gun as the tool for painting. Alternatively, the present invention may be embodied in a programming method for a delivery robot, a programming apparatus for a delivery robot, and delivery robot control system. In this case, a target angle and an advance/retraction angle are unnecessary, so that a process for inputting and storing their values is omitted. Further, the present invention may be embodied a programming method for a handling robot, a programming apparatus for a handling robot, and handling robot control system. In this case, the welding torch is replaced with a hand for handling as the tool.

In the above embodiment, the present invention is embodied as a programming method for a welding robot, a programming apparatus for a robot, and welding robot control system employing a direct teaching method. However, the present invention may employ an offline-teaching method. The offline teaching method typically teaches using a taught point (creates an task program) by displaying model data for the workpiece W created by CAD or the like on the CRT or other display for a personal computer. Teaching means to be used may be an application program (offline teaching system) executed in the personal computer and an input device such as a mouse and a keyboard. The offline-teaching task program needs data conversion in order to be able to be executed in the robot controller RC. During the data conversion, the accuracy of the provided taught point may be deteriorated due to conversion error or a machine difference of the manipulator M1, thereby giving rise to a displacement. In such a case, re-teaching is necessary to match the actual workpiece W. Such a problem can be solved by appropriately modifying the present embodiment as follows. That is, each time the welding torch 14 is positioned to a sensing point, the first step of inputting a sensing instruction and the second step of storing the sensing point and a taught position of the sensing point in a sensing program (first task program) while associating them with each other are executed by using the offline teaching system. That is, the sensing program is created by using the offline teaching system.

Next, after moving the welding torch 14 to the taught position of the sensing point based on the sensing instruction in the sensing program, detection tasks by the laser sensor LS (position detection sensor) are performed. Next, a work location on the workpiece W is acquired based on the detection and stored in an execution program (second task program). Subsequently, by executing the sensing program, the execution program is created. Then, by executing the sensing program, the welding torch 14 is moved to perform machining.

As hereinabove described, the present embodiment is not limited to a direct teaching method and may be embodied in an offline teaching method. In this case, the sensing instruction input means is an input device equipped for a personal computer and the first storage means is a storage medium such as a hard disk in the personal computer.

The invention claimed is:

1. A programming method for a robot, the robot including a manipulator configured to machine a workpiece, the manipulator being equipped with a tool and a position detection sensor for detecting a position of a characteristic site of the workpiece, the method comprising:
a first step for teaching tasks to the robot with the tool being moved, wherein a sensing instruction is input each time the tool reaches a sensing point at which the position detection sensor is to be activated to detect the characteristic site of the workpiece, and a positioning instruction is input each time the tool reaches a taught position other than the sensing point in order to advance the tool to a next taught position without activating the position detection sensor;
a second step for storing each sensing instruction, each positioning instruction, taught position for each sensing point, and each taught position other than the sensing point, in the order in which the positions are taught, in a first task program while associating each sensing instruction and the corresponding taught position for the sensing point with each other and associating each positioning instruction and the corresponding taught position other than the sensing point with each other; and
a third step for moving the tool to the taught position of the sensing point or the taught position other than the sensing point in the order the positions are taught in the first task program, acquiring a work location for the workpiece based on a result of the detection, and then storing the acquired work location in a second task program or in an external variable that can be referenced from the second task program,
wherein by executing the second task program, the tool is moved to perform the machining.

2. The programming method for a robot according to claim 1, further comprising providing a teaching mode, a sensing mode, and an execution mode, wherein:
the first task program is created in the teaching mode;
the first task program is executed to create the second task program in the sensing mode; and
the second task program is executed to machine the workpiece in the execution mode.

3. The programming method for a robot according to claim 1, wherein:
the tool is a welding torch;
when the welding torch has moved to the taught position of the sensing point and a value of at least one of a target angle, an advance angle, or a retraction angle is input, the inputted target angle, advance angle, or retraction angle is stored while being associated with the taught position of the sensing point; and
in the third step, welding seam coordinates are set by using an orientation vector based on the work locations acquired, and a work posture of the welding torch having the welding seam coordinates is calculated based on the inputted target angle, advance angle, or retraction angle and stored in the second task program or the external variable.

4. A programming apparatus for a robot, the robot including a manipulator configured to machine a workpiece, the manipulator being equipped with a tool and a position detection sensor for detecting a position of a characteristic site of the workpiece, the apparatus comprising:
teaching means for teaching tasks to the robot with the tool being moved, wherein a sensing instruction is input each time the tool reaches a sensing point at which the position detection sensor is to be activated to detect the characteristic site of the workpiece, and a positioning instruction is input each time the tool reaches a taught position other than the sensing point in order to advance the tool to a next taught position without activating the position detection sensor;
a first storage for storing each sensing instruction, each positioning instruction, taught position for each sensing point, and each taught position other than the sensing point, in the order in which the positions are taught, in a first task program while associating each sensing instruction and the corresponding taught position for the sensing point with each other and associating each positioning instruction and the corresponding taught position other than the sensing point with each other;
a controller for moving the tool to the taught position of the sensing point based on the sensing instruction or the taught position other than the sensing point based on the positioning instruction, in the order the positions are taught, stored in the first task program;
acquisition means for, when the tool is moved to the taught position of the sensing point, performing detection tasks by the position detection sensor based on the sensing instruction, and acquiring a work location for the workpiece based on a result of the detection; and a second storage for storing the acquired work location in a second task program or an external variable that can be referenced from the second task program, wherein by executing the second task program, the tool is moved to perform the machining.

5. The programming apparatus for the robot according to claim 4, further comprising a teaching mode, a sensing mode, and an execution mode, wherein:

in the teaching mode, the first task program is created by associating the sensing instruction input by the sensor instruction input and the taught position of the sensing point with each other, and is stored in the first storage;

in the sensing mode, the controller executes the first task program to store the work location for the workpiece either in the second storage or in the external variable, the work location being the result of detection by the position detection sensor and having been acquired by the acquisition means; and in the execution mode, the second task program is executed to perform the machining.

6. The programming apparatus for the robot according to claim 4, wherein the tool is a welding torch, the apparatus further comprising:

a posture setter for, when the welding torch has moved to the taught position of the sensing point, setting at least one of a target angle, an advance angle, or a retraction angle;

a coordinates setter for setting welding seam coordinates by using an orientation vector based on the work locations acquired by the acquisition means; and torch posture calculation means for calculating a work posture of the welding torch having the welding seam coordinates based on at least either the target angle, the advance angle, or the retraction angle wherein:

at least one of the target angle, the advance angle, or the retraction angle is stored in the first storage while being associated with the taught position of the sensing point, and the work posture of the welding torch is incorporated in the second task program or the external variable and is stored in the second storage.

7. The programming apparatus for the robot according to claim 6, further comprising a mode selector for selecting the mode type, wherein the mode selector automatically selects the mode type to the sensing mode when the first task program is created in the teaching mode.

8. The programming apparatus for the robot according to claim 6, wherein the position detection sensor is detachable from the manipulator.

9. A robot control system comprising the programming apparatus for the robot according to claim 7 and the controller configured to execute the second task program, wherein the controller moves the tool based on the work location for the workpiece and the work posture of the tool stored in the second task program in the execution mode.

10. The robot control system according to claim 9, wherein the mode selector automatically selects the mode type to the execution mode when the second task program is created in the sensing mode.

* * * * *